March 15, 1960  K. MÜRRLE  2,928,231
AUTOMATIC WINDING DEVICE, PREFERABLY FOR WRIST-WATCHES
Filed Jan. 27, 1956  2 Sheets-Sheet 1
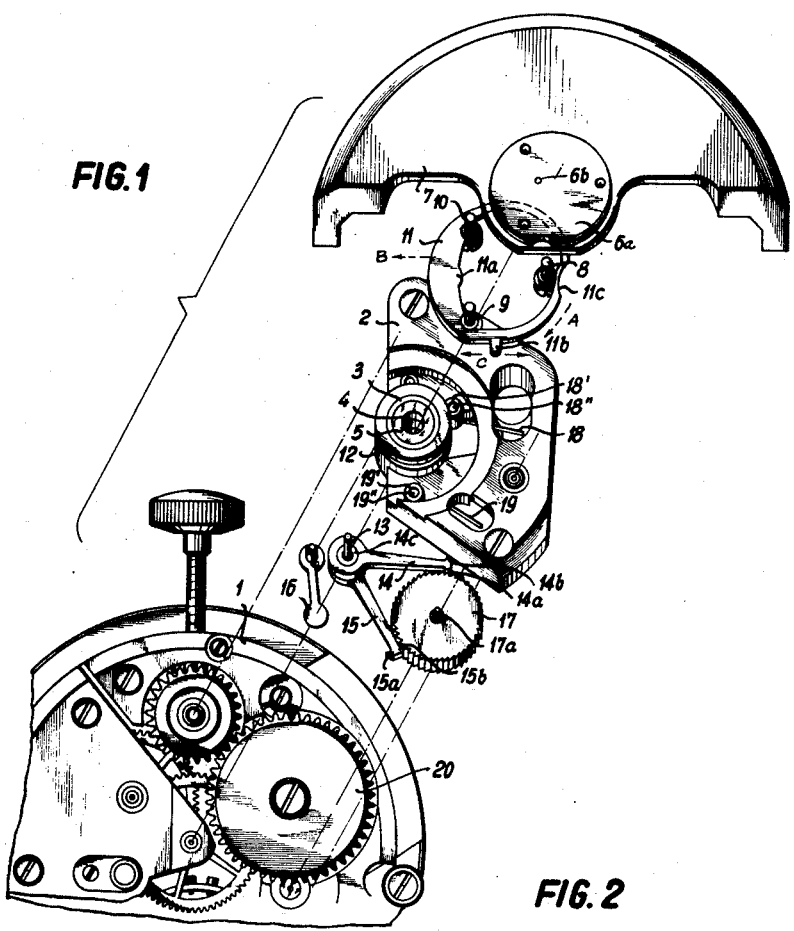
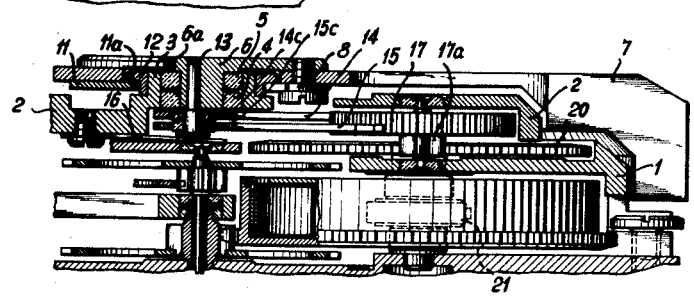
INVENTOR
Kurt Mürrle
By Bryant & Lowry
ATTYS.

March 15, 1960 K. MÜRRLE 2,928,231
AUTOMATIC WINDING DEVICE, PREFERABLY FOR WRIST-WATCHES
Filed Jan. 27, 1956 2 Sheets-Sheet 2

INVENTOR
Kurt Mürrle

ATTYS.

United States Patent Office 2,928,231
Patented Mar. 15, 1960

2,928,231

AUTOMATIC WINDING DEVICE, PREFERABLY FOR WRIST-WATCHES

Kurt Mürrle, Pforzheim, Germany, assignor to Otero-Uhrenrohwerke Otto Epple KG., Konigsbach-Baden, Germany, a firm Application January 27, 1956, Serial No. 561,870

Claims priority, application Germany October 11, 1955

4 Claims. (Cl. 58—82)

The invention relates to an automatic or self-winding device for watches, preferably wrist-watches. It is known to automatically wind wrist-watches by a suitable device utilizing the natural movements of the arm of a person wearing the watch. The movement of a flyweight relative to the watch is transmitted to the spring of the movement by means of gearing. In order to utilize the force produced by the flyweight, irrespectively of the direction in which it occurs, a rectifying gear is introduced. However, the known rectifying gears are composed of a great number of parts and, therefore, require a considerable amount of the power produced. Moreover, the fact must also be considered that the flywheel mass or flyweight producing the force imparts a great deal of its power in short quick alternating movements which the known rectifying gears, owing to the inertia and play between their many parts, can only follow with corresponding losses of power.

The object of the invention is, therefore, to provide a self-winding system and a device in which these objections are avoided.

The self-winding device, particularly for wrist-watches, according to the invention consists of a ratchet wheel, a flyweight adapted to swing alternately in either direction, and thrust rods between said flyweight and said ratchet wheel and acted upon by said flyweight to transmit the movements thereof to said ratchet wheel always in the same direction of rotation.

With the aid of an eccentric connected to a wheel of a reduction transmission gear, the thrust rods mounted on rings running on this eccentric are moved and the heads of these thrust rods resiliently bear alternately at diametrically opposite points on the periphery of the ratchet wheel with entrainment teeth acting in the same direction of rotation. At the same time a friction clutch is introduced in front of the driving wheel of the core of the movement spring.

The system and the device present the advantage that extremely few parts are required and consequently the short and rapid alternating movements of the flywheel mass or flyweight are transmitted to the movement spring with the smallest possible loss of force and motion. The device, due to its small number of parts and their advantageous mutual arrangement, can save a considerable amount of space and be of very flat construction, with the result that a wrist-watch in which it is fitted can also be of very flat or thin construction. Moreover, the new device, due to its few parts, is also cheap to produce. By introducing a friction clutch, an overloading of the self-winding device or its parts when the movement spring is almost or completely wound, is avoided. Other details are given in the following description with reference to the accompanying drawings.

Two preferred embodiments of the invention are illustrated by way of example in the six figures of the accompanying drawings, in which Fig. 1 is a perspective view of a first form of construction of the automatic winding device with the parts drawn laterally apart;

Fig. 2 is a vertical section of the device;

Figure 3:
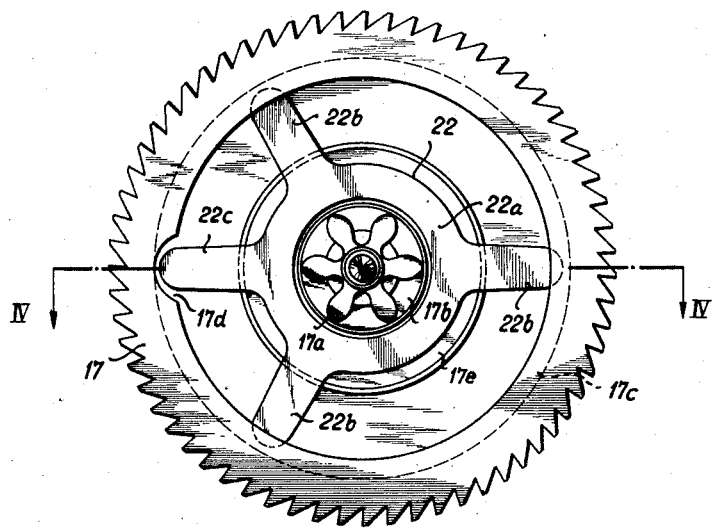
Fig. 3 is an enlarged top plan view of a form of construction of a friction clutch within a ratchet wheel.

The self-winding device is screwed on to a movement 1 forming its base, by means of a bridge 2 on which all its parts are movably mounted. In the form of construction illustrated in Figs. 1 and 2 a bearing sleeve 3 is provided on the bridge 2 and, to obtain favorable frictional conditions, bearing jewels 4, 5 are mounted therein. The last mentioned is, however, not absolutely essential. The bearing sleeve 3 can be a separate constructional element and attached to the bridge 2 in any suitable manner. A rotor shaft 6 of a flyweight 7 is fitted in the bearing sleeve 3 or bearing jewels or stones 4, 5 thereof. It is connected to the flyweight 7 by three shoulder screws 8, 9, 10. The shoulders of these screws 8, 9, 10 serve for receiving an oscillatable resilient locking ring 11. The axial play of the flyweight 7 is limited on the one hand by the bearing stone or jewel 5 and the collar 6a of the rotor shaft 6 and on the other hand by a nose 11a on the inner circumference of the locking ring 11 and the edge of a cylindrical flanged ring 12 pressed on to the bearing sleeve 3 and projecting beyond the nose 11a. The bearing sleeve 3 and the ring 12 may be made in one piece. To remove the flyweight 7, the locking ring 11 is simultaneously rotated and displaced laterally as shown by the dotted arrows A and B of Fig. 1 by moving the same towards the left by means of an outwardly projecting manipulating lug 11b, by means of which it is swung about the screw 10 as shown by the direction arrow C. In so doing, the resistance of an inwardly bent, narrowed, and therefore resilient part 11c of the locking ring 11 must be overcome as it slides along the shoulder of the screw 8 which is substantially diametrically opposite the nose 11a on the inner circumference of the locking ring 11. During this swinging movement the abutment of the locking ring 11, hitherto bearing against the shoulder of the screw 9, moves away from this screw until the nose 11a is clear of the outwardly projecting edge of the ring 12. The flyweight 7 is thus freed and can be lifted out of the bearing jewels or stones 4, 5 in upward direction together with the rotor shaft 6.

In the form of construction illustrated in Figs. 1 and 2, a pin is loosely mounted as eccentric 13 in a bore 6b in the rotor shaft 6 within the periphery and eccentrically to the central axis thereof. On this eccentric pin 13 two thrust rods 14, 15 are oscillatably mounted by means of their hub rings or bearing stones 14c, 15c mounted therein and engage a pawl winding wheel 17. The eccentric pin 13 has a head engaging under the bearing stones 14c, 15c, which rests on a rigid or resilient tongue 16 and determines its play in axial direction. When the flyweight 7 is removed from the bearing 3, the eccentric pin 13 remains standing free in the bore of the bearing stones 4, 5 on account of the hub rings of the thrust rods 14, 15 engaging under the bearing 3. The point of the pin projects above the upper surface of the bearing stone 5. Consequently, the re-entry of the eccentric pin 13 into the eccentric bore 6b of the rotor shaft 6, when refitting the latter in the bearing 3, is greatly facilitated. By mounting the eccentric pin 13 within the rotor shaft 6, the surfaces between these parts and those with the hub rings or bearing stones 14c, 15c of the thrust rods 14, 15 are reduced in size and consequently the friction is much less. This prevents the flyweight 7 from carrying with it the eccentric pin 13 or the thrust rods 14, 15, and these rods from being lifted off their pawl winding wheel 17 against the action of their resiliency so that they no longer act thereon.

The two thrust rods 14, 15 have on the oppositely directed longitudinal sides of their ends pointing straight ahead, projecting pawl teeth 14a, 15b, 14b, 15a engaging in opposite directions in their longitudinal direction. The two thrust rods 14, 15 are identically shaped stamped parts and can therefore be produced with one and the same punching tool. When assembling, the thrust rods 14, 15 are placed around and against the teeth of the pawl winding wheel 17 under spring action in such a manner that, as shown for example in Fig. 1, the upper thrust rod 14 engages with its tooth 14a directed for pulling and the lower thrust rod 15 with its tooth 15b directed for pushing the teeth of the pawl winding wheel 17. This arrangement has the effect that, when the flyweight 7 swings in either direction, either the one or the other of the two thrust rods 14, 15 turns the pawl winding wheel 17 in the same direction of rotation, in the example illustrated in Fig. 1 in counterclockwise direction, whereas the rod which is not actually operating with its tooth, slides back idly over the teeth of the pawl winding wheel 17 against the action of its spring arm, owing to the back of the tooth being inclined, and then reengages the ratchet wheel.

The thrust rods 14, 15 are caused to bear resiliently against the periphery of the pawl winding wheel 17 by means of blade springs 18, 19 which are carried by hollow cylindrical, longitudinally slit holders 18', 19' mounted rotatable against friction on fixed pins 18", 19" in the bridge 2.

Figure 4:
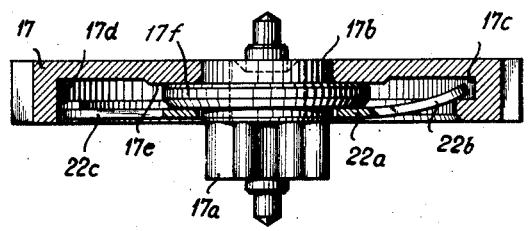
Fig. 4 is a vertical section on the line IV—IV of Fig. 3.

A friction clutch is fitted in the self-winding device in front of a driving wheel 20 of a spring core 21 accommodated in the movement 1. According to Figs. 3 and 4 the friction clutch is arranged within the pawl winding wheel 17. For this purpose the pawl winding wheel 17 has a hub 17b constructed as a pawl winding pinion 17a and at the same time separated from the pawl winding wheel, the two parts being rotatable the one relatively to the other. A star-shaped friction spring 22 has a central ring 22a which bears against the hub 17b of the pawl winding wheel 17 owing to the fact that radial resilient arms 22b are introduced through a clearance 17d into an internal peripheral annular groove 17c of the rim of the pawl winding wheel 17 and tensioned. Thus annular surfaces 17e of the pawl winding wheel 17 and its hub 17b are pressed one against the other. The pressure of the star-shaped friction spring 22 is such that when the movement spring is not wound at all or not nearly wound the friction between the annular surfaces 17e is sufficient for transmitting the rotary movement of the pawl winding wheel 17 to the hub 17b and through the intermediary of the driving wheel 20 to the movement spring core 21 and consequently to the movement spring. When the movement spring is nearly or completely wound the resistance thereof and consequently that on the hub 17b of the pawl winding wheel 17 is, however, so great that the friction between their annular surfaces 17e is no longer sufficient for transmitting movement but consequently they slide one on the other. This prevents the parts of the self-winding device from being overstressed and from possible damage resulting therefrom.

To prevent the friction spring 22 itself from turning and its resilient arms 22b from springing out through the clearance 17d in the rim of the pawl winding wheel 17 serving for their introduction, an additional arm 22c of the friction spring 22 engages in the clearance 17d.

From the above detailed description of the invention, it is believed that the construction will at once be apparent, and while there are herein shown and described preferred embodiments of the invention, it is nevertheless to be understood that minor changes may be made therein without departing from the spirit and scope of the invention as claimed.

I claim:

1. A self-winding time piece including a movement powered by a spring windable by a driving wheel, a self-winding mechanism comprising a bridge supporting a rotor shaft and fly-weight and mounted in overlying relation to said movement, a pawl wheel journaled on said bridge and operatively connected to said driving wheel for rotating the same and winding said spring, a force transmitting means operatively connected between said rotor shaft and said pawl wheel, a bearing sleeve on said bridge projecting away from said movement, an annular ring fixed to and projecting outwardly from said bearing sleeve, said rotor shaft being journaled in said bearing sleeve for axial displacement therefrom, and a lock ring manually displaceably supported beneath said rotor shaft and including a locking portion displaceably engageable beneath said annular ring for retaining said rotor shaft and fly-weight against axial removal.

2. The structure of claim 1; said force transmitting means comprises a downwardly opening bore in said rotor shaft, parallel to and eccentric of the axis of rotation of said rotor shaft, and a pin supported by said bridge and projecting into said bearing sleeve for receipt into said bore.

3. The structure of claim 2; said pin including an enlarged head at its lower end, a tongue secured to said bridge and terminating beneath said bearing sleeve for supporting the pin therein after the fly-weight and rotor shaft have been removed from said bearing sleeve.

4. The structure of claim 1; said flyweight including a plurality of headed screws depending therefrom and forming groove portions with the underside of said flyweight and receiving said locking ring therein, the annular ring being disposable above the headed screws and abuttingly engageable with the locking portion of said locking ring.

References Cited in the file of this patent

UNITED STATES PATENTS

| 2,563,112 | Hill et al. | Aug. 7, 1951 |
| 2,696,073 | Langel | Dec. 7, 1954 |
| 2,739,682 | Detwiler | Mar. 27, 1956 |
| 2,807,133 | Maire | Sept. 24, 1957 |

FOREIGN PATENTS

| 842,029 | Germany | June 23, 1952 |
| 286,563 | Switzerland | Feb. 16, 1953 |
| 289,759 | Switzerland | July 1, 1953 |
| 297,076 | Switzerland | May 17, 1954 |
| 704,393 | Great Britain | Feb. 24, 1954 |
| 705,930 | Great Britain | Mar. 24, 1954 |